United States Patent
Sato et al.

[11] Patent Number: 5,181,129
[45] Date of Patent: Jan. 19, 1993

[54] ELECTRONIC BLACKBOARD

[75] Inventors: Kunio Sato; Susumu Akimaru, both of Hitachi; Nobuyoshi Hoshi; Yasuro Hori, both of Katsuta, all of Japan

[73] Assignee: Hitachi, Ltd., Tokyo, Japan

[21] Appl. No.: 490,467

[22] Filed: Mar. 8, 1990

[30] Foreign Application Priority Data

Mar. 17, 1989 [JP] Japan .................................. 1-063747

[51] Int. Cl.$^5$ .............................................. H04N 1/04
[52] U.S. Cl. ..................... 358/494; 358/474; 358/296
[58] Field of Search ............... 358/494, 496, 497, 498, 358/486, 452, 400, 401, 471, 474, 296, 300, 302

[56] References Cited

U.S. PATENT DOCUMENTS

| | | | |
|---|---|---|---|
| 4,720,749 | 1/1988 | Satake | 358/452 |
| 4,819,078 | 4/1989 | Tadokoro et al. | 358/494 |
| 4,884,146 | 11/1989 | Yatsunami | 358/494 |

FOREIGN PATENT DOCUMENTS

| | | |
|---|---|---|
| 61-47300 | 3/1986 | Japan . |
| 62-155666 | 7/1987 | Japan . |
| 62-180656 | 8/1987 | Japan . |
| 62-245855 | 10/1987 | Japan . |
| 63-64799 | 3/1988 | Japan . |

Primary Examiner—Edward L. Coles, Sr.
Assistant Examiner—Thomas D. Lee
Attorney, Agent, or Firm—Antonelli, Terry, Stout & Kraus

[57] ABSTRACT

An electronic blackboard having a copy function, and an edit function or communication function. A single reading unit is used in common for both reading an image on a flat board and reading an image or an original document. Reflected light from the flat board and from the original document is converged and projected onto a light receiving surface of a single photoelectric conversion element. An image of the flat board of the original document can be selectively read, or the composite image of both the flat board and original document can be read. Further, the electrical signal corresponding to the image can be modulated and transmitted, and a received electrical signal can be demodulated to reproduce a corresponding image. Furthermore, in accordance with the electrical signal obtained by photoelectrically converting an image, the layout of the image on the flat board can be determined and edited to change the shape of the image.

13 Claims, 12 Drawing Sheets

ELECTRONIC BLACKBOARD

BACKGROUND OF THE INVENTION

The present invention relates to an electronic blackboard having a copying function and suited to be used at a conference or the like, and more particularly to an intelligent electronic board suitable for reading characters and graphics of an original document and displaying them on a writing/drawing flat board.

An electronic blackboard having a copying function can copy on a recording paper an image of characters and graphics (hereinafter collectively called simply an image) written with a felt pen or the like on a writing/drawing flat board (hereinafter simply called a flat board) and usually is installed within a conference room or the like. This electronic blackboard is generally made of a white plate so that it is called a white board, or the name of this electronic blackboard is derived from the fact that it electronically reads an image on the flat board and copies it onto a recording paper. Similar to an ordinary blackboard using a solid particle member (chalk), the electronic blackboard has a flat board of large size to allow other persons to easily recognize an image. Different from the ordinary blackboard, the electronic blackboard has a function of copying an image on the flat board when necessary during a conference, to thereby record the proceedings of the conference or distribute copies to conference participants or clerks so as to make it unnecessary for them to write or draw the image. The electronic blackboard has another function of reading an original document such as handwritten data, general printed matters and the like and displaying them on the flat board. To read an image on the flat board and an image on an original document, a conventional electronic blackboard has been provided with a reader unit for reading an image on the flat board and another reader unit for reading an image on an original document, as disclosed in JP-A-61-47300.

The electronic blackboard disclosed therein comprises a pair of right and left rolls for winding a white board sheet having a plurality of writing surfaces, a drive mechanism for the rolls, means for photoelectrically converting information such as characters and graphics written on the sheet, means for outputting and printing the converted information, means for photoelectrically converting an image written on an ordinary paper, and means for writing the converted image information on the white board sheet. This electronic blackboard therefore has a photoelectric conversion unit for the flat board and another photoelectric conversion unit for an original document.

There is also disclosed and shown in FIG. 1 of JP-A-62-180656 a technique by which a single CCD line image sensor (shared photoelectric conversion unit) is used in common to read characters, graphics and the like on a blackboard or on an original document.

With the above-described prior art, it has been necessary to provide two independent optical systems, one for photoelectrically reading an image written on the flat board, the other for photoelectrically reading an image written on an original document. The reason for providing two optical systems is that the resolution of each photoelectric conversion element of the photoelectric conversion unit is required to be adjusted in accordance with the size of the image, which is different between the flat board and original document. The resolution herein used means the degree of fineness of pixel size, which is a minimum unit of photoelectric conversion by a photoelectric conversion unit. The resolution quantitatively means the number of lines of an image per unit length capable of being converted photoelectrically.

The resolution may be 1.4 lines/mm for an image on the flat board and 4.2 lines/mm for an image on an original document, the resolution being coarse for an image on the flat board which is larger than an ordinary original document and is generally written with large characters or graphics to allow visual recognition from a remote place.

Another reason for providing two optical systems is the concept that an operation panel should be mounted in front of the flat board. Accordingly, the original reader unit and its operation panel have been mounted at the area where a chalk saucer is located. Specifically, the flat board reader unit is mounted at the side end portion of the flat board, and the original document reader unit is mounted in front of the flat board. This concept arises from an adherence to the view that the operation panel should be mounted in front of the apparatus, similar to the operation panel of a copying machine, image scanner (image reader) or the like.

Provision of two optical systems results in an optical system which is bulky and high cost, and requires precise adjustment of the mechanical components thereof (e.g., image sensor array, optical lens, light source lamp, mechanism for holding these elements, and the like), and long adjustment time. These factors have restricted the total cost of the white board.

A conventional white board is of a stand-alone type so that electrical signals of an image are used only within the white board. Therefore, there is no mutual connection between white boards. It often becomes inconvenient if only a single white board is provided at the conference with a number of participants. Even if a plurality of white boards are used, the same image is required to be written on the plurality of white boards, thereby taking a long time for image writing. Further, a conventional white board, although it has a copying function, cannot change or edit as desired an image once inputted, the change or editing of an image including such as layout, enlargement, reduction, rotation, reversal (inclusive of negative/positive reversal) and the like.

SUMMARY OF THE INVENTION

It is a primary object of the present invention to make sufficient the adjustment of an optical system for reading an original document and flat board once carried out, to thereby simplify the optical system.

It is another object of the present invention to make compact the optical system for reading an original image and flat board, to thereby make the electronic blackboard small.

It is a further object of the present invention to directly display prepared conference data on a flat board without hand-writing it, and to add other data or correct the displayed data through hand-writing.

It is a still further object of the present invention to allow communication with other image communication apparatus.

It is another object of the present invention to edit a displayed image or recorded image so as to make it visually more recognizable, by means of enlargement or reduction.

In order to achieve the above objects, the present invention provides an electronic blackboard which uses a single reader unit, commonly used as a reader unit for an image on a flat board and a reader unit for an image on an original document.

In other words, the single image reader unit reads light reflected from either the flat board or the original document.

Light reflected from the flat board and the original image is converged and projected to a plane of a photoelectric conversion element so that the image on either the flat board or the original document, or the images on both the flat board and original document, can be read.

The optical axis of the optical system is changed to read the image on either the flat board or the original document, or to read the images on both the flat board and original document.

Further, there is provided a communication unit for modulating and transmitting an electrical signal of an image and receiving and demodulating a transmitted electrical signal to reproduce an image.

Furthermore, there is provided an editor unit for determining a layout of an image on the flat board in accordance with an electrical signal obtained by photoelectrically converting the image, or editing to change the shape of the image.

In the intelligent board, a single reader unit applies light to an original document or the flat board and photoelectrically converts the reflected light therefrom into an electrical signal which is recorded as an image on a recording medium by an image recording unit. In addition, the editor unit edits the image corresponding to the electrical signal. The communication unit receives/transmits electrical signals from/to another intelligent board or other communication sites. The optical system of the intelligent board can be simplified, made compact and low cost, allowing use of a plurality of intelligent boards with relatively low cost. Communication between intelligent boards is also possible.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

An electronic blackboard of this invention will be described in detail in connection with the preferred embodiments.

Figure 1:
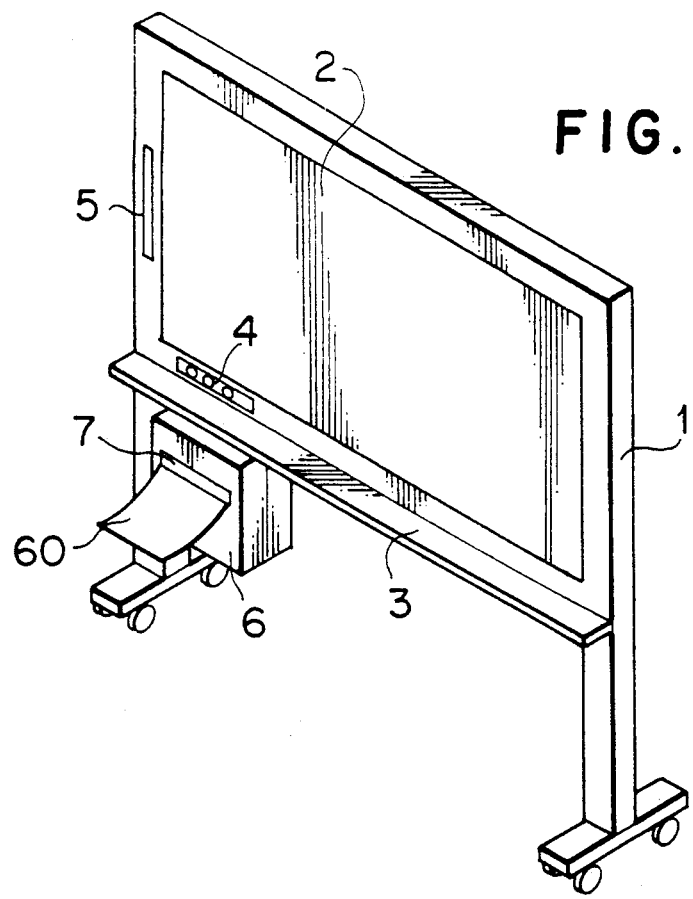
FIG. 1 is a perspective view showing a first embodiment of this invention.

FIG. 1 is a perspective view showing the entirety of the apparatus according to a first embodiment of this invention. Reference numeral 1 represents a housing, 2 a sheet type flat board, 3 a saucer on which a writing utensil or marker pen is put, 4 an operation panel of the apparatus, 5 an inlet into which an original document is inserted, 6 a recording unit, and 7 an outlet from which a recording paper 60 is ejected out.

The apparatus is broadly divided into (i) a flat board, (ii) a reader optical unit, (iii) a flat board writing unit, and (iv) a recording unit.

Figure 2:
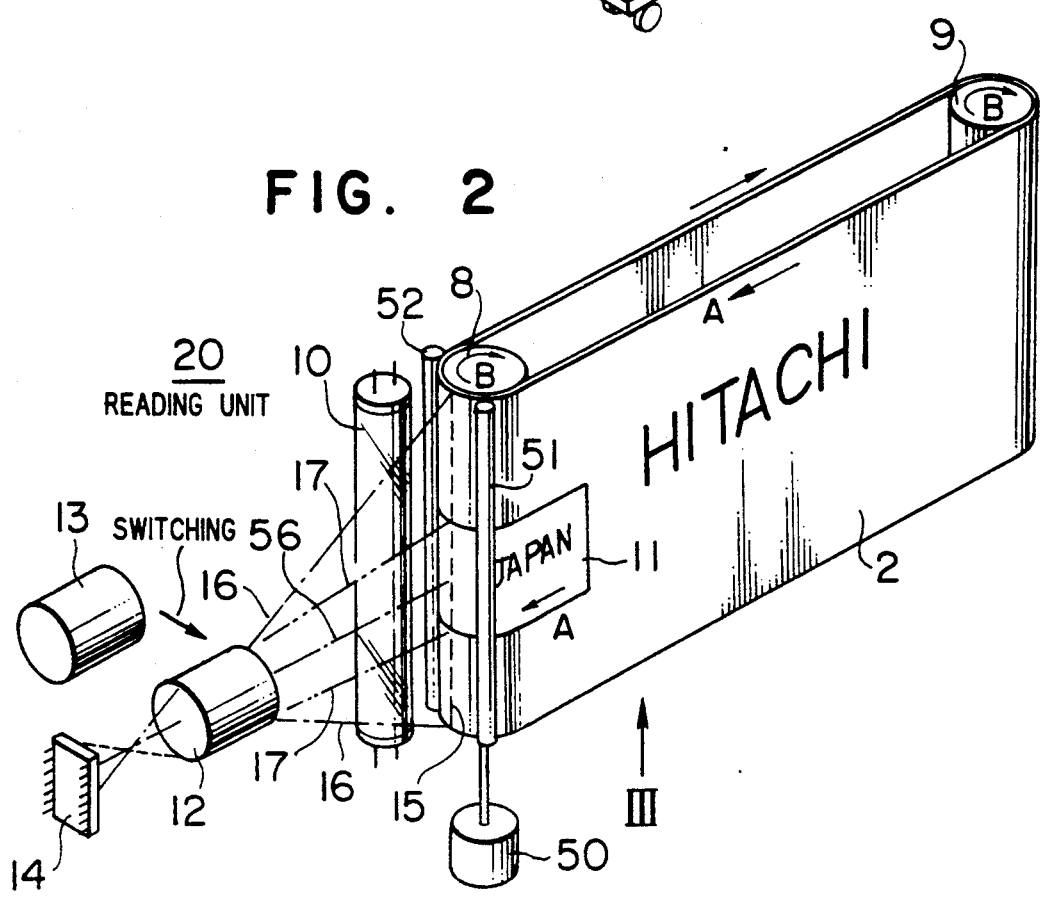
FIG. 2 is a perspective view of the reader optical unit shown in FIG. 1.

FIG. 2 shows the structure of the reader optical unit (ii) within the housing 1. Reference numerals 8 and 9 represent rollers for moving the flat board 2 in the direction indicated by an arrow A, 10 a light source fluorescent lamp, 11 an original document, 12 a lens (convex lens) for converging reflected light 16 from the flat board 2, 13 lens (convex lens) for converging a reflected light 17 from the original document 11, 14 an image sensor such as a charge coupled device (CCD) for reading linearly the reflected light 16 from the flat board 2 and the reflected light 17 from the original document 11, 15 a reading line, 50 a motor for rotating the roller 8, and 51 and 52 rollers for feeding an original document 11.

Referring to FIG. 2, in reading an image, e.g., "HITACHI", displayed on the flat board 2 (in this case, the original document 11 has been removed), the fluorescent lamp 10 illuminates the flat board 2. The light 16 reflected from the flat board 2 at the reading line 15 is converged to the flat board lens 12 and focussed to the light receiving surface (indicated by a broken line) of the image sensor 14 to thereby photoelectrically convert the reflected light of one line. One page of the flat board 2 is read by continuously repeating the one line photoelectric conversion, while driving the motor 50 to rotate the rollers 8 and 9 in the direction indicated by arrow B and move the flat board 2 in the direction A indicated by an arrow.

In reading an image, e.g., "JAPAN", written on the original document 11, after changing the flat board lens 12 to the original document lens 13, the original document 11 is moved to the position as shown in FIG. 2 by means of the roller 51. The fluorescent lamp 10 illuminates the original document 11, and the light 17 reflected from the original document 11 at the reading line 15 is converged by the original document lens 13 and focussed on the light receiving surface of the image sensor 14 to thereby photoelectrically convert the reflected light of one line. One page of the original document 11 is read by continuously repeating the one line photoelectric conversion, while driving the motor 50 to rotate the rollers 51 and 52 and move the original document 11 in the direction indicated by arrow A.

Figure 3:
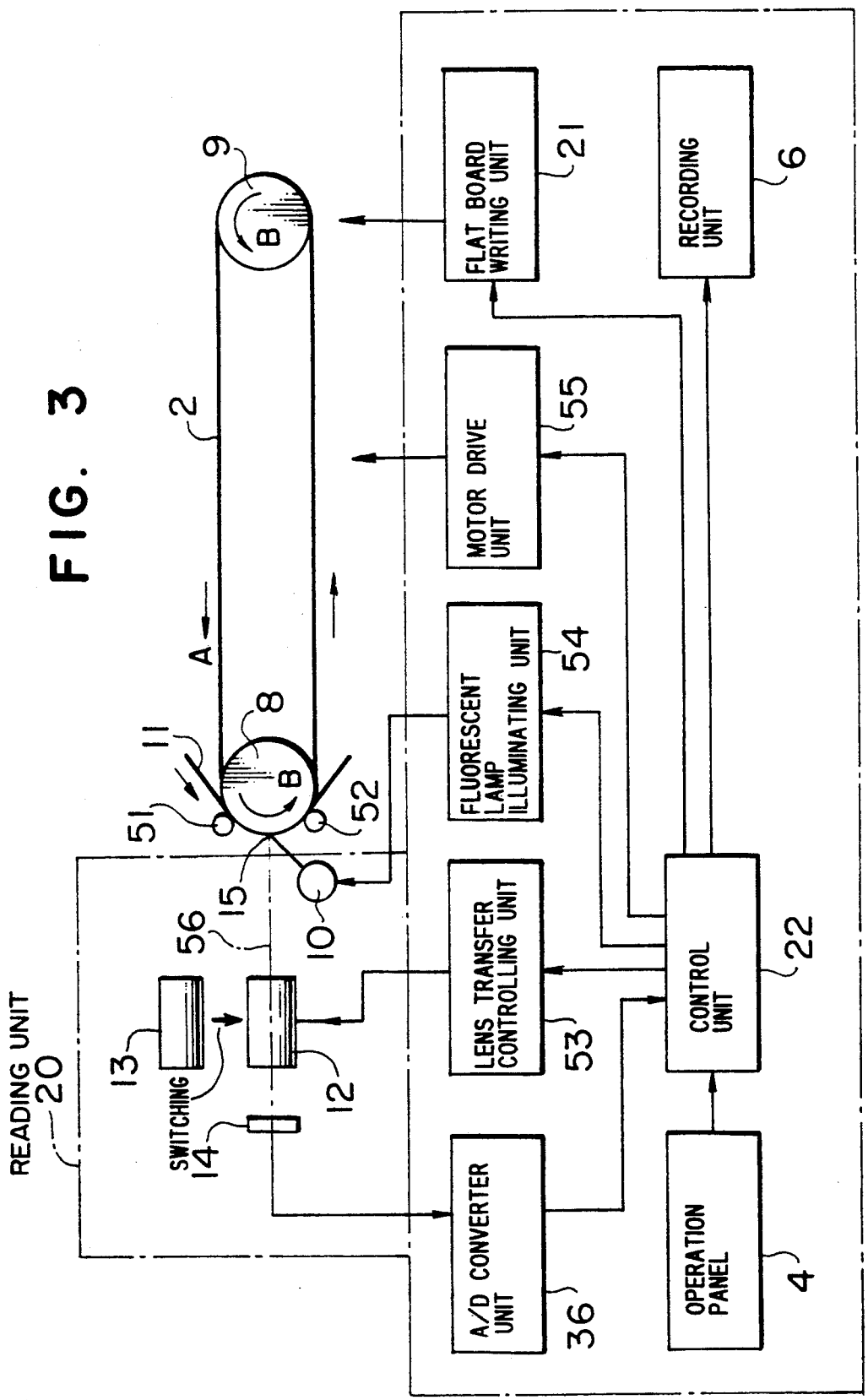
FIG. 3 shows the structure, in the form of a block diagram, of the first embodiment shown in FIG. 1.

FIG. 3 shows the structure of the reading optical system shown in FIG. 2 as viewed from the direction III, and the block diagram of the circuit of the apparatus shown in FIG. 1. Reference numeral 4 represents an operation panel, 6 a recording unit for recording an image on a recording paper 60 in accordance with image signals outputted from a control unit 22, 21 a flat board writing unit for displaying an image on the flat board 2 in accordance with image signals outputted from the control unit 22, 22 the control unit for controlling the operations of the apparatus in accordance with a signal from the operation panel 4, 36 an analog/digital (A/D) converter unit, 53 a lens transfer control unit for moving the flat board lens 12 and original image lens 13, 54 a fluorescent lamp illuminating unit for controling the turn on and turn off of the fluorescent lamp 10, and 56 an optical axis of the reflected light, at the reading line, from the original document 11 or flat board 2 illuminated by the fluorescent lamp 10. Referring to FIG. 3, the following three operations (1) to (3) can be carried out.

(1) In reading an image on the original document 11 and displaying it on the flat board 2, the original document lens 13 is first moved within the optical axis 56 in response to a signal from the operation panel 4. The original document 11 is moved in the direction indicated by arrow A by means of the rollers 8 and 51 and is stopped when the leading edge of the original document 11 is nipped between the rollers 8 and 52. The reflected light on optical axis 56, at the reading line 15, from the original document 11, which is illuminated by the fluorescent lamp 10, is converged by the original document lens 13 and converted into an image signal with the image sensor 14. The A/D converter unit 36 converts the image signal into a digital image signal which is outputted to the control unit 22. The control unit 22 outputs to the flat board writing unit 21 the image signal supplied from the A/D converter unit 36. The flat board writing unit 21 displays the image of the original document 11 on the flat board 2 in accordance with the image signal supplied from the control unit 22.

(2) In reading an image on the original document 11 and recording it on a recording paper 60, similar to the operation (1), the original document lens 13 is first moved within the optical axis 56 in response to a signal from the operation panel 4. The reflected light on optical axis 56 at the reading line 15, from the original document 11, which is illuminated by the fluorescent lamp 10, is converged by the original document lens 13 and converted into an image signal with the image sensor 14. The A/D converter unit 36 converts the image signal into a digital image signal which is outputted to the control unit 22. The control unit 22 outputs to the recording unit 6 the image signal supplied from the A/D converter unit 36. The recording unit 6 records the image of the original document 11 on the recording paper in accordance with the image signal supplied from the control unit 22.

(3) In reading an image displayed on the flat board 2 and recording it on the recording paper 60 (without the original document 11 shown in FIG. 3), the flat board lens 12 is first moved within the optical axis 56 in response to a signal from the operation panel 4. The reflected light, on optical axis 56, at the reading line 15, from the flat board 2, which is illuminated by the fluorescent lamp 10, is converged by the flat board lens 12 and converted into an image signal with the image sensor 14. The A/D converter unit 36 converts the image signal into a digital image signal which is outputted to the control unit 22. The control unit 22 outputs to the recording unit 6 the image signal supplied from the A/D converter unit 36. The recording unit 6 records the image displayed on the flat board 2 on the recording paper 60 in accordance with the image signal supplied from the control unit 22.

The control unit 22 outputs the image signal supplied from the A/D converter unit 36, in response to a signal from the operation panel 4, selectively either to the flat board 21 or the recording unit 6. In addition, in order to perform the above operations (1) to (3), the control unit 22 operates to generate control signals for the lens transfer control unit 53, fluorescent lamp illuminating unit 54, motor driving unit 55 and the like, and to correct the displayed image to an upright position when the original document is slanted. Further, a function to read and write an IC card (not shown) may be incorporated to allow displaying an image recorded in the IC card on the flat board 2 and recording an image recorded in the IC card on the recording paper 60, or writing into the IC card an image on the flat board 2 or an image on the original document.

According to the first embodiment of this invention, the electronic blackboard comprises the flat board 2 capable of being written with an image by using a writing utensil, the light source 10 for illuminating the flat board 2 and the original document 11, the lenses 12 and 13 for converging the reflected light 16 and 17 from the flat board 2 and original document 11, the reading unit 20 constructed of the photoelectric conversion unit for converting the reflected light converged by the lenses into an image signal, the flat board writing unit 21 for displaying an image on the flat board 2 in accordance with the image signal supplied by the reading unit 20, and the recording unit 6 for recording an image on the recording paper 60 in accordance with the image signal supplied by the reading unit 20. Accordingly the following effects ① to ③ can be obtained:

① The adjustment of the reading optical unit for reading both the original document 11 and flat board 2 is sufficient if it is carried out only once, thereby lowering the manufacturing cost.

② The reading optical system for reading both the original document 11 and flat board 2 can be made compact, thereby making the apparatus small.

③ In addition to the function of a conventional electronic blackboard, prepared conference data can be read with the electronic blackboard of this invention and displayed on the flat board without hand-writing, the displayed data may be corrected through hand-writing, or other, conference data may be added thereto through hand-writing. Accordingly conference participants can concentrate on discussion with efficient conference proceedings.

Figure 4:
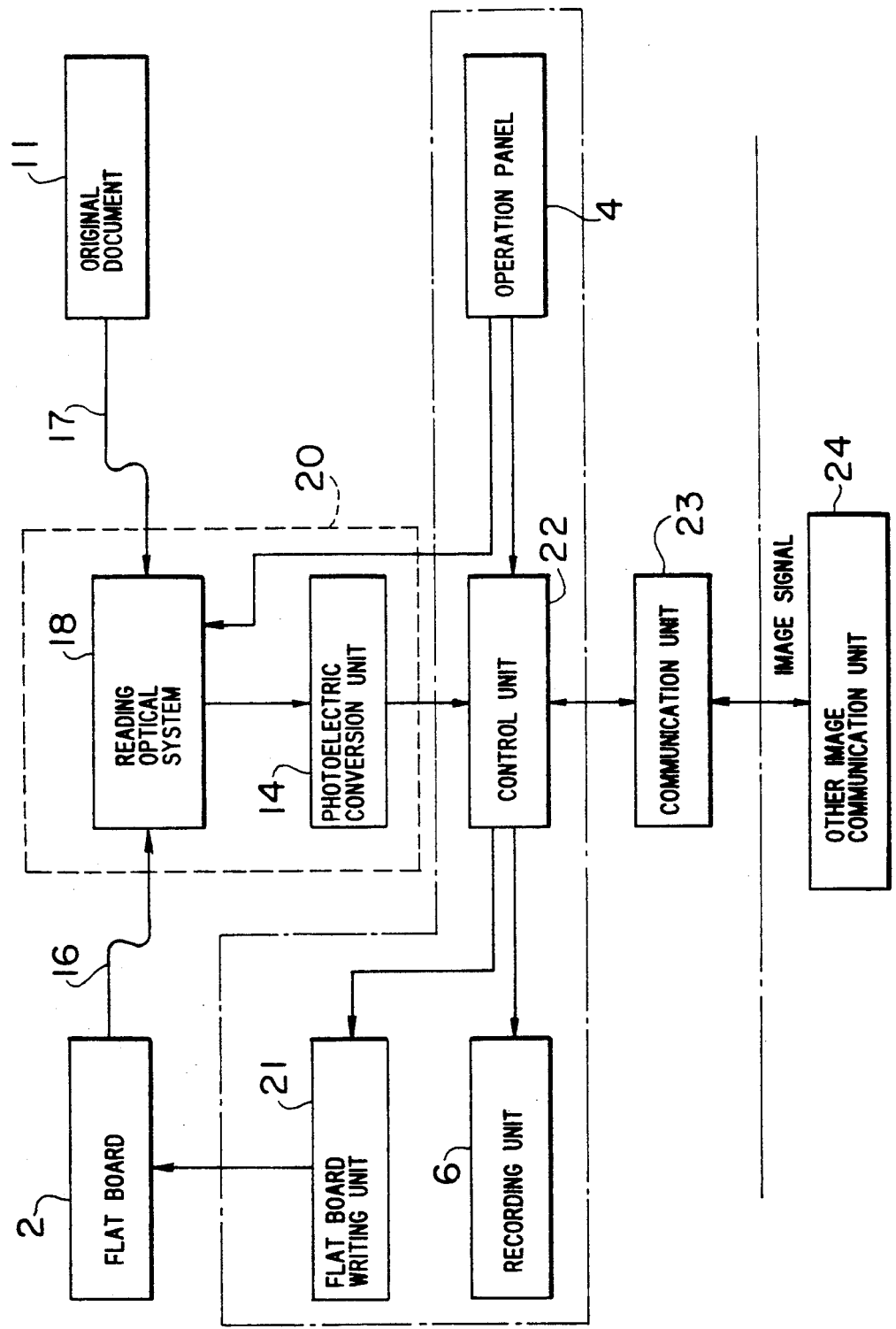
FIG. 4 shows the structure, in the form of a block diagram, of a second embodiment of this invention.

Next, the second embodiment of this invention will be described with reference to FIG. 4. Reference numeral 23 represents a communication unit, and 24 represents another image communication apparatus. The communication unit 23 transmits the image signal supplied from the reading unit 20 to another image communication apparatus 24, and receives the image signal transmitted from the other communication apparatus 24 to supply it to the control unit 22. The apparatus shown in FIG. 4 carries out the same operations (1) to (3) described with FIG. 3, and the following four additional operations:

(4) In reading an image on the original document 11 and transmitting it to the other image processing apparatus 24, the lens 12 is changed to the lens 13 for switching reading optical system 18 to the optical document 11 side, in response to a signal from the operation panel 4. The reflected light 17 from the original document 11 is converged by the reading optical system 18 and converted into an image signal by photoelectric conversion unit 14. The control unit 22 outputs to the communication unit 23 the image signal supplied from the photoelectric conversion unit 14. The communication unit 23 transmits the image signal supplied from the control unit 22 to the other image communication apparatus 24 which records the image on a recording paper 61 in FIG. 5.

(5) In reading an image on the original document 11 and transmitting to the other image communication apparatus 24, the lens 13 is changed to the lens 12 for switching the reading optical system 18 to the flat board 2 side, in response to a signal from the operation panel 4. The reflected light 16 from the flat board 2 is converged by the reading optical system 18 and converted into an image signal by the photoelectric conversion unit 14. The control unit 22 outputs to the communication unit 23 the image signal supplied from the photoelectric conversion unit 14. The communication unit 23 transmits the image signal supplied from the control unit 22 to the other image communication apparatus 24 which records the image on the recording paper 61.

(6) In displaying an image signal transmitted from the other image communication apparatus 24 on the flat board 2, the communication unit 23 receives the image signal and outputs it to the control unit 22. The control unit 22 outputs to the flat board writing unit 21 the image signal supplied from the communication unit 23. The flat board writing unit 21 displays the image on the flat board 2 in accordance with the image signal supplied from the control unit 22.

(7) In recording the image signal transmitted from the other image communication apparatus 24 on the recording paper 60, the communication unit 23 receives the image signal and outputs it to the control unit 22. The control unit 22 outputs the image signal supplied from the communication unit 23 to the recording unit 6. The recording unit 6 records the image on the recording paper 60 in accordance with the image signal supplied from the control unit 22.

Figure 5:
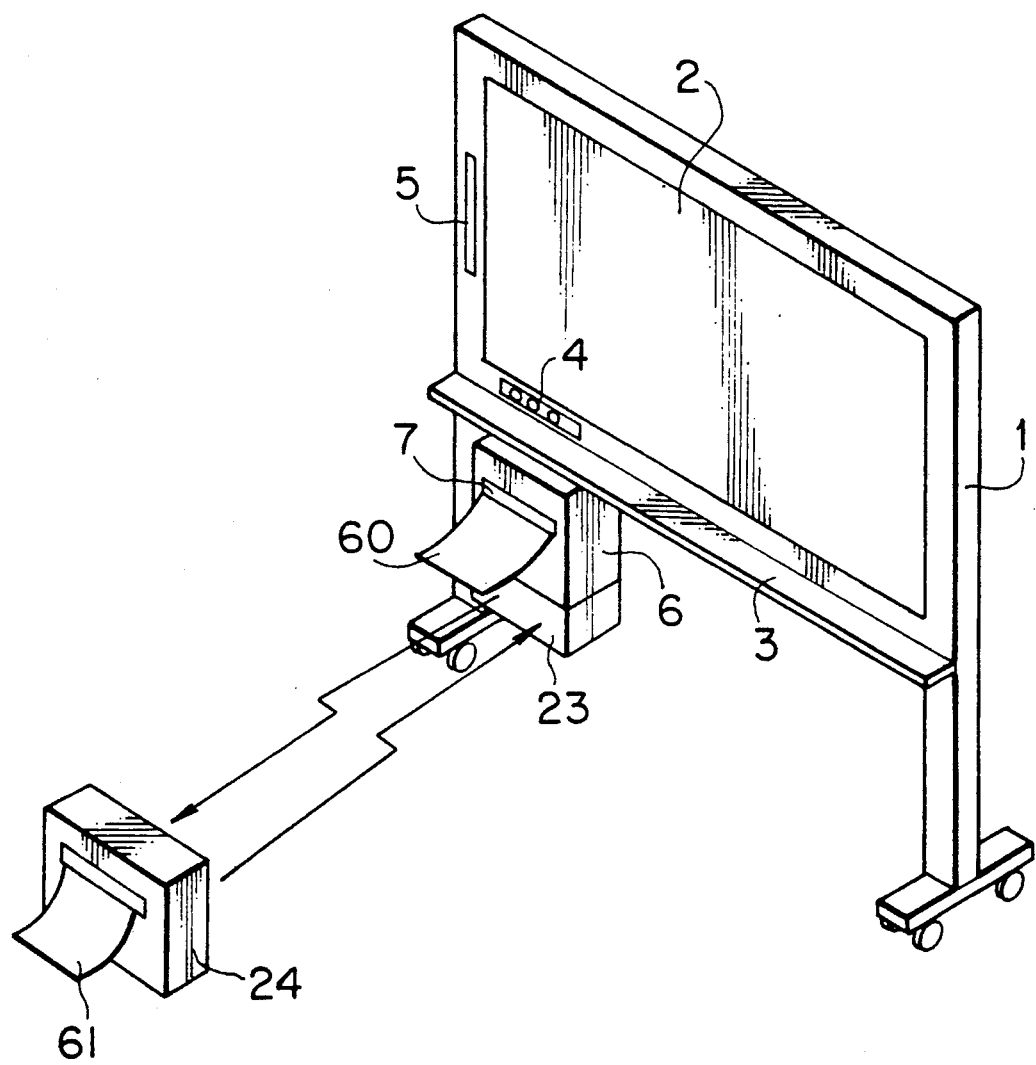
FIG. 5 is a perspective view of the second embodiment.

FIG. 5 is a perspective view showing the overall structure of the apparatus according to the second embodiment of this invention.

According to the second embodiment of this invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lenses into an electrical signal, the communication unit for transmitting the electrical signal outputted from the reading unit to another image communication apparatus or receiving the electrical signal transmitted from another image communication apparatus, the flat board writing unit for displaying an image on the flat board in accordance with the electrical signal supplied from the reading unit or the electrical signal received by the communication unit, and the recording unit for recording an image on the recording paper, in accordance with the electrical signal supplied from the reading unit or the electrical signal received at the communication unit. Accordingly the following effect ④ in addition to the effects ① to ③ of the first embodiment of this invention can be obtained:

④ The following functions are available. Namely, reading an image on the original document and transmitting it to another image communication apparatus, reading an image on the flat board and transmitting it to another image communication apparatus, displaying an image signal transmitted from another image communication apparatus on the flat board, recording the image signal transmitted from another image communication apparatus on the recording paper, and other functions.

The third embodiment of the present invention will be described with reference to FIG. 6. Reference numeral 25 represents an editor unit, and reference numeral 22 represents the control unit. The editor unit 25 edits the image signal outputted from the reading unit 20, and outputs it to the control unit 22. In the apparatus shown in FIG. 6, the editor unit 25 edits, e.g., performs enlargement, reduction, layout change or the like, of the image written on the original document 11 or the image displayed on the flat board 2, respectively outputted from the photoelectric conversion unit 14 of the reading unit 20, and outputs it to the control unit 22.

Figure 6:
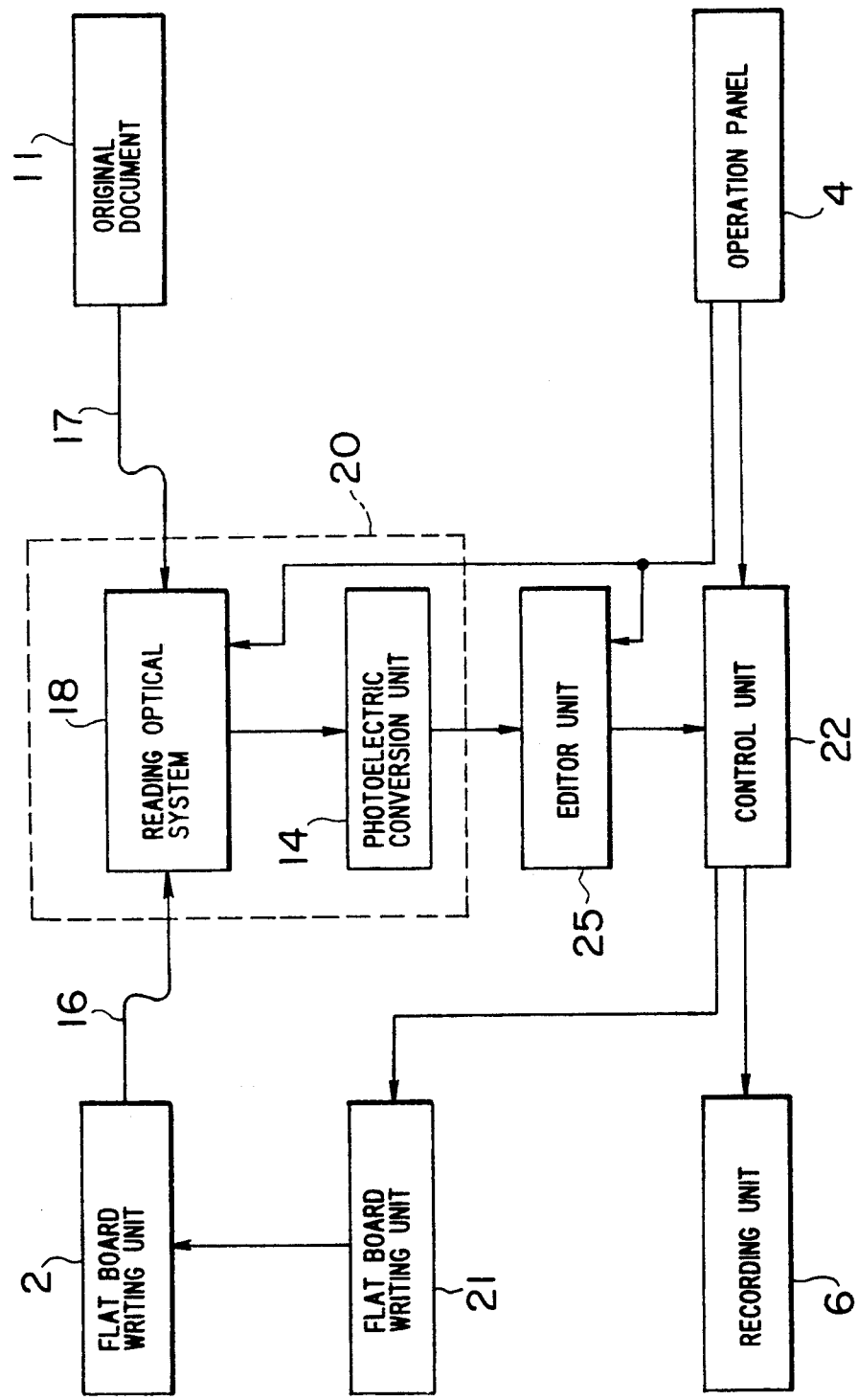
FIG. 6 shows the structure, in the form of a block diagram, of a third embodiment of this invention.
Figure 7:
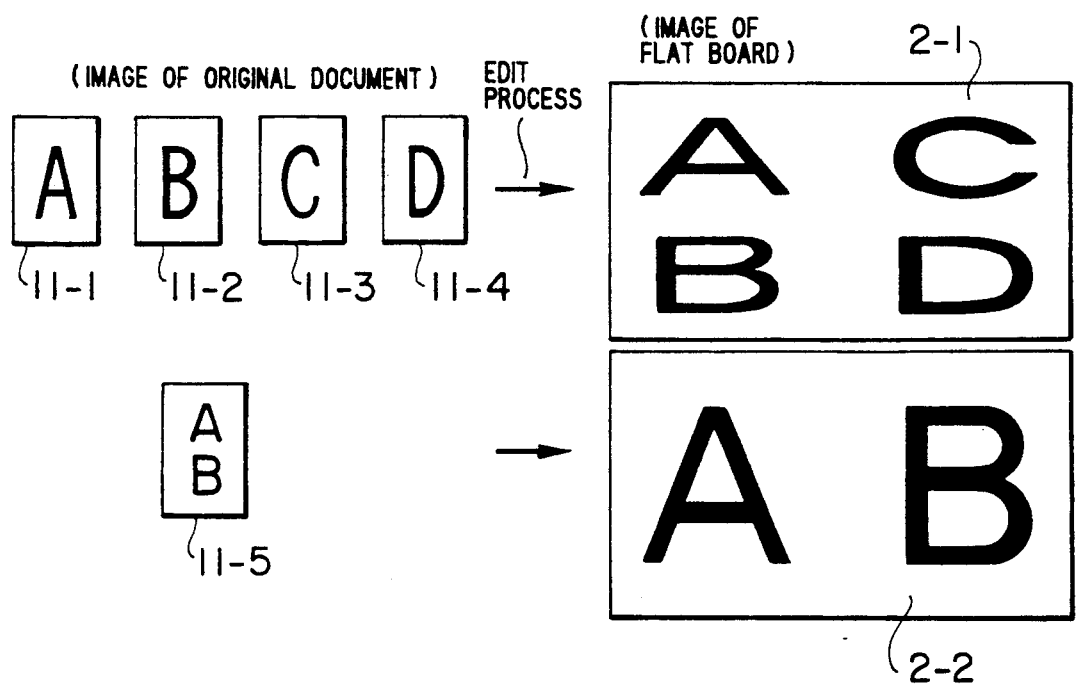
FIG. 7 is a diagram illustrating a function of the editor unit shown in FIG. 6.

FIG. 7 shows an example of editing by the editor unit 25 shown in FIG. 6.

In FIG. 7, reference numerals 11-1, 11-2, 11-3, 11-4 and 11-5 represent an original document respectively, and reference numerals 2-1 and 2-1 represent a flat board respectively. The upper half of FIG. 7 shows an example where four original documents are read and they are edited by the editor unit 25 to display them on the flat board 2-1 such that the images A to D written on the four original documents 11-1, 11-2, 11-3 and 11-4 respectively are divisionally displayed on the flat board 2-1 as shown in FIG. 7. The lower half of FIG. 7 shows an example where the single original document 11-5 is read and it is edited by the editor unit 20 to display it on the flat board 2—2 such that the upper and lower images A and B on the original document 11-5 are divisionally displayed on the right and left sides of the flat board 2—2. The examples shown in FIG. 7 are only for the purpose of explaining the editing function by the editor unit 25, and other image enlargement, reduction, rotation, movement or the like can be provided. Image information editing includes various types of change in the image information before editing. In the above description, the image written on the original document is edited and displayed on the flat board. The image written on the flat board may also be edited and recorded on the recording paper, as is apparent from the block diagram shown in FIG. 6.

Figure 8:
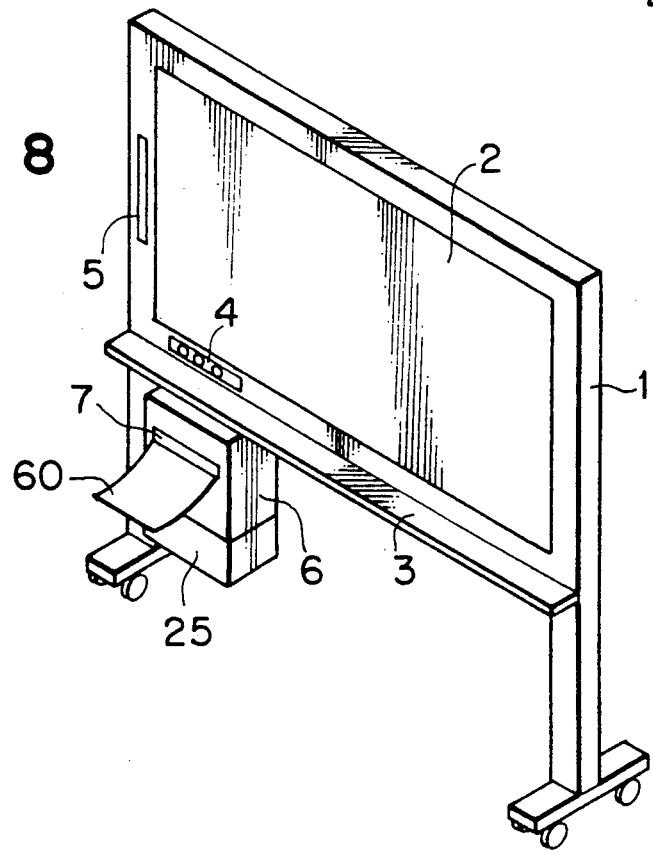
FIG. 8 is a perspective view of the third embodiment shown in FIG. 6.

FIG. 8 is a perspective view of the third embodiment of this invention shown in FIG. 6, wherein the editor unit 25 is additionally provided on the recording unit 6 of the first embodiment of this invention shown in FIG. 1.

According to the third embodiment of this invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lenses into an electrical signal, the editor unit for editing the electrical signal supplied from the reading unit, the flat board writing unit for displaying an image on the flat board in accordance with the electrical signal supplied from the editor unit, and the recording unit for recording an image on the recording paper in accordance with the electrical signal supplied from the editor unit. Accordingly the following effect ⑤ in addition to the effects ① to ③ of the first embodiment of this invention can be obtained:

⑤ Images on the original document and flat board are read and edited to display them on the flat board or the recording paper, so that the displayed or printed image can be visually recognized easily to permit efficient conference proceedings.

Figure 9:
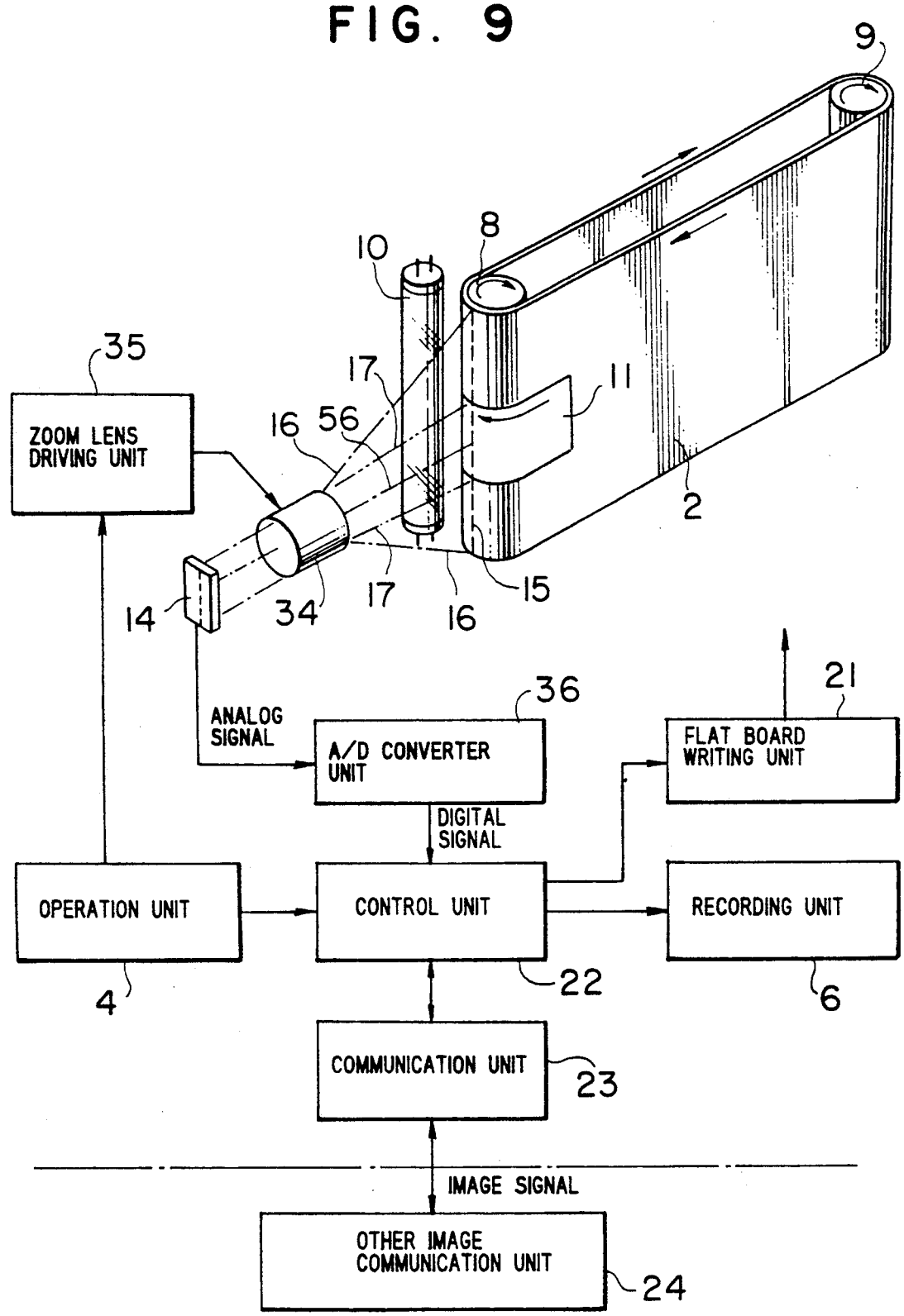
FIG. 9 shows the structure, in the form of a block diagram, of a fourth embodiment of this invention.

The fourth embodiment of this invention will be described with reference to FIG. 9 showing the structure in the form of a block diagram of the fourth embodiment. Reference numeral 34 represents a zoom lens, 35 a zoom lens driving unit, and 36 an analog/digital (A/D) converter unit. In the apparatus shown in FIG. 9, in reading an image written on the flat board 2, the fluorescent lamp 10 illuminates the flat board 2. The reflected light therefrom is converged by the zoom lens 34 and focussed on the light receiving surface (indicated by a broken line) of the image sensor 14. Since a signal from the operation panel 4 has been previously entered in the zoom lens driving unit 35, the reduction factor of the zoom lens 34 has been set such that the height of the flat board 2 corresponds to the length of the light receiving surface of the image sensor 14. The image sensor 14 photoelectrically converts the image of the flat board 2 at the reading line 15, and thereafter the image signal outputted from the image sensor 14 is converted into a digital image signal by the A/D converter unit 36. Alternatively, in reading an image written on the original document, prior to starting reading, in response to a signal from the operation panel, the zoom lens driving unit 35 sets the reduction factor of the zoom lens 34 such that the height of the original document 11 corresponds to the length of the light receiving surface of the image sensor 14. The fluorescent lamp 10 illuminates the original document 11, and the reflected light therefrom is converged by the zoom lens 34 and focussed on the light receiving surface of the image sensor 14. The image sensor photoelectrically converts the image of the original document 11 at the reading line 15, and thereafter, the image signal outputted from the image sensor 15 is converted into a digital image signal by the A/D converter unit 36. The image signal read in the above manner is sent to another image communication apparatus 24 via the communication unit 23, or conversely the communication unit 23 receives the image signal sent from another image communication apparatus 24 and displays it on the flat board 2 or records it on the recording paper.

According to the fourth embodiment of this invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lenses into an electrical signal, the communication unit for transmitting the electrical signal supplied from the reading unit to another image communication apparatus or receiving the electrical signal transmitted from another image communication apparatus, the flat board writing unit for displaying an image on the flat board in accordance with the electrical signal supplied from the reading unit or the electrical signal received at the communication unit, and the recording unit for recording an image on the recording paper in accordance with the electrical signal supplied from the reading unit or the electrical signal received at the communication unit, to thereby use the same optical axis of the reflected light for both the flat board and original document. Accordingly the following effect ⑥ in addition to the effects ① to ④ of the second embodiment of this invention can be obtained:

⑥ Instead of using the flat board lens 12 and original document lens 13 which are selectively used in accordance with the application purpose, there is used the zoom lens 34 whose reduction factor can be changed continuously as desired. Therefore, it is unnecessary to use the lens transfer controlling unit 53 for switching between the flat board lens 12 and original document lens 13 shown in FIG. 3, thereby making the overall dimension of the apparatus small.

Figure 10:
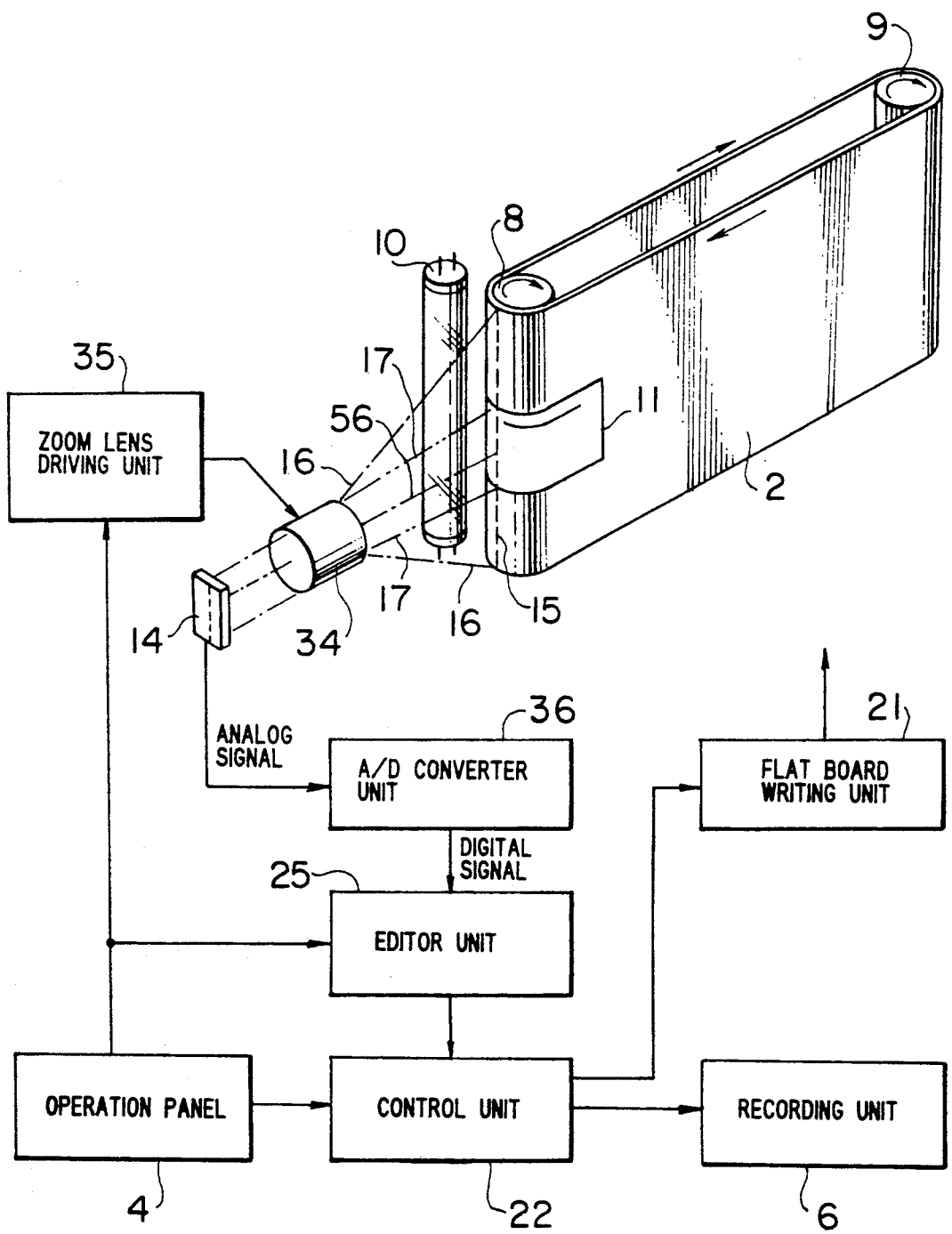
FIG. 10 shows the structure, in the form of a block diagram, of a fifth embodiment of this invention.

The fifth embodiment of this invention will be described with reference to FIG. 10 showing the structure in the form of a block diagram of the fifth embodiment. Reference numeral 34 represents a zoom lens, 35 a zoom lens driving unit, and 36 an analog/digital (A/D) converter unit. In the apparatus shown in FIG. 10, in reading an image written on the flat board 2, the fluorescent lamp 10 illuminates the flat board 2. The reflected light therefrom is converged by the zoom lens 34 and focussed on the light receiving surface (indicated by a broken line) of the image sensor 14. Since a signal from the operation panel 4 has been previously entered in the zoom lens driving unit 35, the reduction factor of the zoom lens 34 has been set such that the height of the flat board 2 corresponds to the length of the light receiving surface of the image sensor 14. The image sensor 14 photoelectrically converts the image of the flat board 2 at the reading line 15, and thereafter the image signal outputted from the image sensor 14 is converted into a digital image signal by the A/D converter unit 36. Alternatively, in reading an image written on the original document, prior to starting reading, in response to a signal from the operation panel, the zoom lens driving unit 35 sets the reduction factor of the zoom lens 34 such that the height of the original document 11 corresponds to the length of the light receiving surface of the image sensor 14. The fluorescent lamp 10 illuminates the original document 11, and the reflected light therefrom is converged by the zoom lens 34 and focussed on the light receiving surface of the image sensor 14. The image sensor photoelectrically converts the image of the original document 11 at the reading line 15, and thereafter, the image signal outputted from the image sensor 14 is converted into a digital image signal by the A/D converter unit 36. The editor unit 25 edits as shown in FIG. 7 the image signal read in the above manner to thereby display it on the flat board 2 or record it on the recording paper.

According to the fifth embodiment of this invention, the apparatus comprises the flat board capable of being written with an image by using a writing utensil, the light source for illuminating the flat board and the original document, the zoom lens for converging the reflected light from the flat board and original document, the reading unit constructed of the photoelectric conversion unit for converting the reflected light converged by the zoom lens into an electrical signal, the editor unit for editing the electrical signal outputted from the reading unit, the flat board writing unit for displaying an image on the flat board in accordance with the electrical signal supplied from the editor unit, and the recording unit for recording an image on the recording paper in accordance with the electrical signal outputted from the editor, to thereby use the same optical axis of the reflected light for both the flat board and original document. Accordingly the following effects ⑤ and ⑥ described with FIGS. 6 and 9 can be obtained:

⑤ Images on the original document and flat board are read and edited to display them on the flat board or the recording paper, so that the displayed or printed image can be visually recognized easily to permit efficient conference proceedings.

⑥ Instead of using the flat board lens 12 and original document lens 13 which are selectively used in accordance with the application purpose, there is used the zoom lens 34 whose reduction factor can be changed continuously as desired. Therefore, it is unnecessary to use the lens transfer controlling unit 53 for switching between the flat board lens 12 and original document lens 13 shown in FIG. 3, thereby making the overall dimension of the apparatus small.

Figure 11:
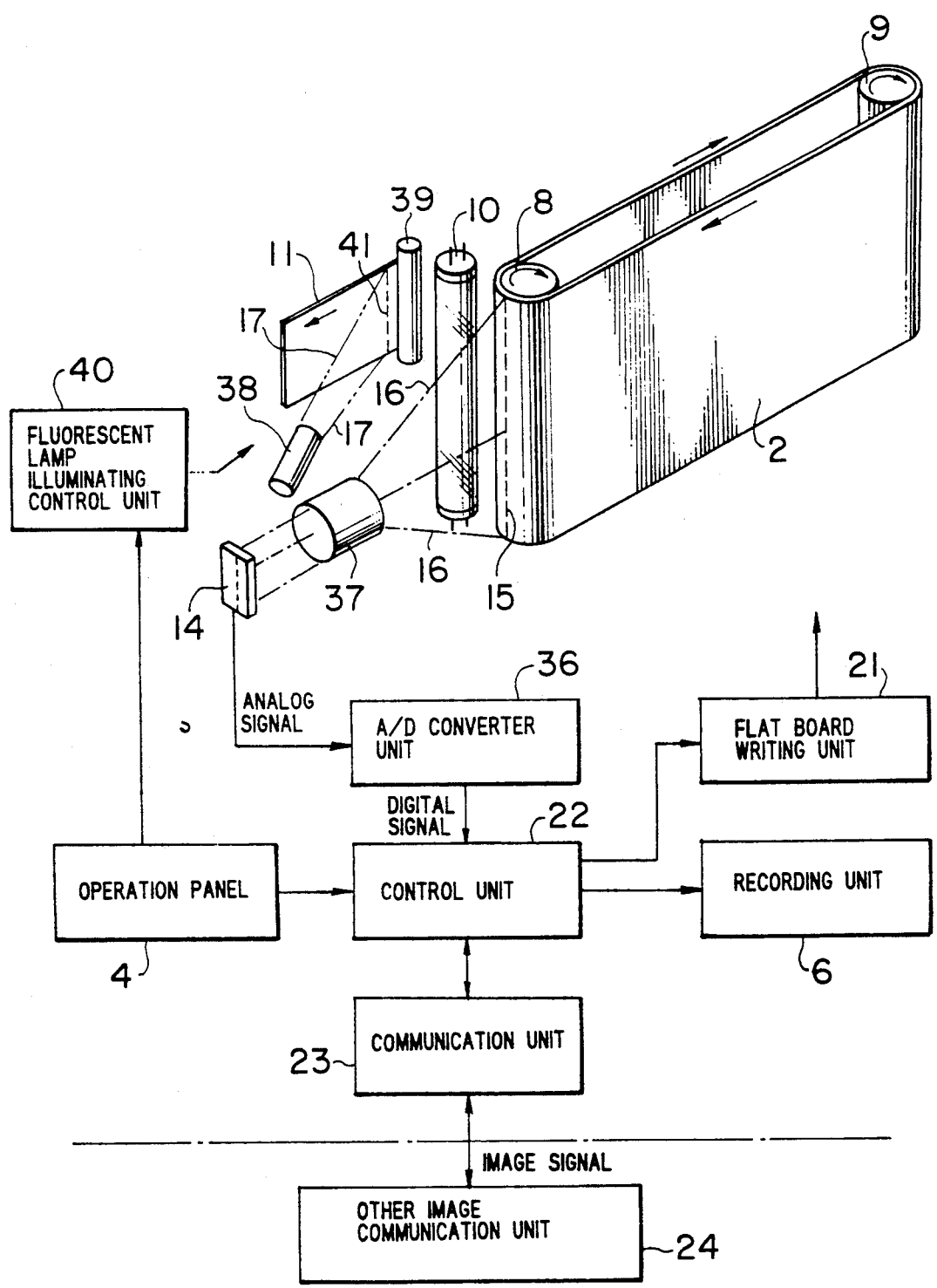
FIG. 11 shows the structure, in the form of a block diagram, of a sixth embodiment of this invention.

The sixth embodiment of this invention will be described with reference to FIG. 11 showing the structure in the form of a block diagram of the sixth embodiment. Reference numerals 37 and 38 represent a flat board lens and an original document lens, respectively, 39 a second fluorescent lamp, 40 a fluorescent lamp illuminating control unit, and 41 a reading line for the original document 11. In the apparatus shown in FIG. 11, in reading an image written on the flat board 2, prior to starting reading, the fluorescent lamp illuminating control unit 40 turns on the fluorescent lamp 10 to illuminate the flat board 2 and turns off the fluorescent lamp 39 to not illuminate the original document 11, in response to a signal from the operation panel 4. The reflected light from flat board 2 is converged by the first lens 37 and focussed on the light receiving surface (indicated by a broken line) of the image sensor 14. The reduction factor of the first lens 37 is set such that the height of the flat board 2 corresponds correctly with the length of the light receiving surface of the image sensor 14. The image sensor 14 photoelectrically converts the image of the flat board 2 at the reading line 15, and thereafter the image signal outputted from the image sensor 14 is converted into a digital image signal by the A/D converter unit 36. Alternatively, in reading an image written on the original document 11, prior to starting reading, in response to a signal from the operation panel 4, the fluorescent lamp illuminating control unit 40 turns off the first fluorescent lamp 10 to illuminate the flat board 2 and turns on the second fluorescent lamp 39 for illuminating the original document 11. The second fluorescent lamp 39 then illuminates the original document 11, and the reflected light 17 therefrom is converged by the second lens 38 and focussed on the light receiving surface of the image sensor 14. The reduction factor of the second lens 38 is set such that the height of the original document 11 corresponds correctly with the length of the light receiving surface of the image sensor 14. The image sensor 14 photoelectrically converts the image of the original document 11 at the reading line 41, and thereafter, the image signal outputted from the image sensor 14 is converted into a digital image signal by the A/D converter unit 36. The communication unit 23 transmits the image signal read in the above manner to another image communication apparatus 24, or receives the image signal transmitted from another image communication apparatus 24 to thereby display it on the flat board 2 or record it on the recording paper.

According to the sixth embodiment of this invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lens into an electrical signal, the communication unit for transmitting the electrical signal supplied from the reading unit to another image communication unit or receiving the electrical signal transmitted from another image communication apparatus, the flat board writing unit for displaying an image on the flat board in accordance with the electrical signal supplied from the reading unit or the electrical signal received at the communication unit, and the recording unit for recording an image on the recording paper in accordance with the electrical signal supplied from the reading unit or the electrical signal received at the communication unit, to thereby use different optical axes of the reflected light for the flat board and original document. Accordingly the following effects ⑦ to 10 in addition to the effects ③ and ④ of the second embodiment of this invention can be obtained:

⑦ The reading unit for reading the original document can be mounted at a desired position of the intelligent board, to thereby improve the operability.

⑧ While reading the flat board, the image on the original document can be transmitted to another image communication apparatus.

⑨ While reading the original document, the image on the flat board can be transmitted to another image communication apparatus.

⑩ The images on both the flat board and original document can be picked up optically at the same time, and the composite image can be transmitted to another image communication apparatus. In this case, both the first and second fluorescent lamps 10 and 39 illuminate.

Figure 12:
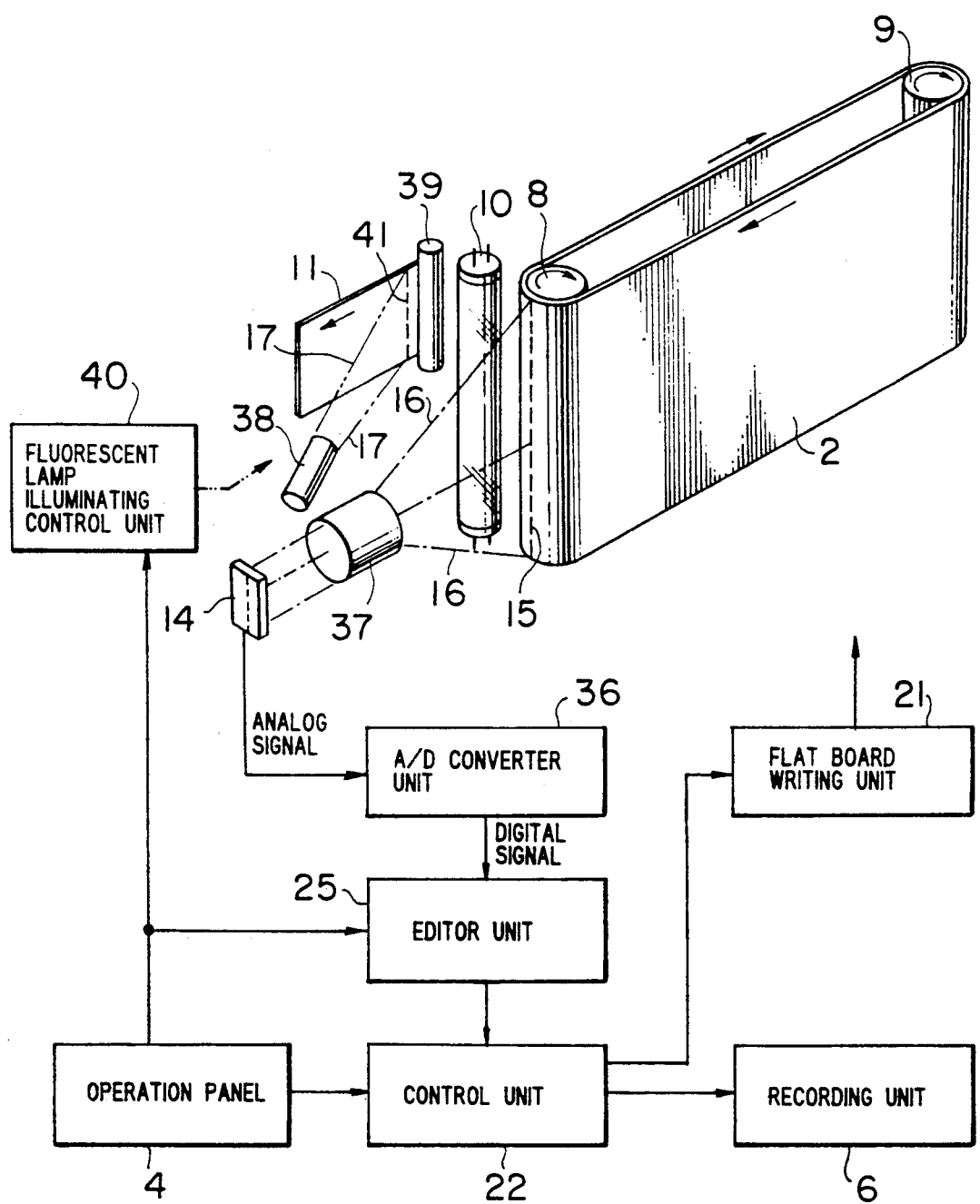
FIG. 12 shows the structure, in the form of a block diagram, of a seventh embodiment of this invention.

The seventh embodiment of this invention will be described with reference to FIG. 12 showing the structure in the form of a block diagram of the seventh embodiment. Reference numerals 37 and 38 represent a flat board lens and an original document lens, respectively, 39 a second fluorescent lamp, 40 a fluorescent lamp illuminating control unit, and 41 a reading line for the original document 11. In the apparatus shown in FIG. 12, in reading an image written on the flat board 2, prior to starting reading, the fluorescent lamp illuminating control unit 40 turns on the fluorescent lamp 10 to illuminate the flat board 2 and turns off the fluorescent lamp 39 to not illuminating the original document 11, in response to a signal from the operation panel 4. The reflected light 16 from flat board 2 is converged by the lens 37 and focussed to the light receiving surface (indicated by a broken line) of the image sensor 14. The reduction factor of the lens 37 is set such that the height of the flat board 2 corresponds to the length of the light receiving surface of the image sensor 14. The image sensor 14 photoelectrically converts the image of the flat board 2 at the reading line 15, and thereafter the image signal outputted from the image sensor 14 is converted into a digital image signal by the A/D converter unit 36. Alternatively in reading an image written on the original document 11, prior to starting reading, in response to a signal from the operation panel 4, the fluorescent lamp illuminating control unit 40 turns off the fluorescent lamp 10 to not illuminate the flat board 2 and turns on the fluorescent lamp 39 to illuminate the original document 11. The reflected light 17 from original document 11 is converged by the lens 38 and focussed to the light receiving surface of the image sensor 14. The reduction factor of the lens 38 is set such that the height of the original document 11 corresponds to the length of the light receiving surface of the image sensor 14. The image sensor 14 photoelectrically converts the image of the original document 11 at the reading line 41, and thereafter, the image signal outputted from the image sensor 14 is converted into a digital image signal by the A/D converter unit 36. The editor unit 25 edits as shown in FIG. 6 the image signal read in the above manner, to thereby display it on the flat board 2 or record it on the recording paper.

According to the seventh embodiment of this invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lens into an electrical signal, the editor unit for editing the electrical signal supplied from the reading unit, the flat board writing unit for displaying an image on the flat board in accordance with the electrical signal supplied from the editor unit, and the recording unit for recording an image on the recording paper in accordance with the electrical signal supplied from the editor unit, to thereby use different optical axes of the reflected light for the flat board and original document. Accordingly the following effect ⑩ in addition to the effects ③, ⑤ and ⑦ can be obtained:

⑩ The images on both the flat board and original document can be picked up optically at the same time, and the composite image can be edited, with both the first and second fluorescent lamps 10 and 39 illuminated, as in the sixth embodiment.

Figure 13:
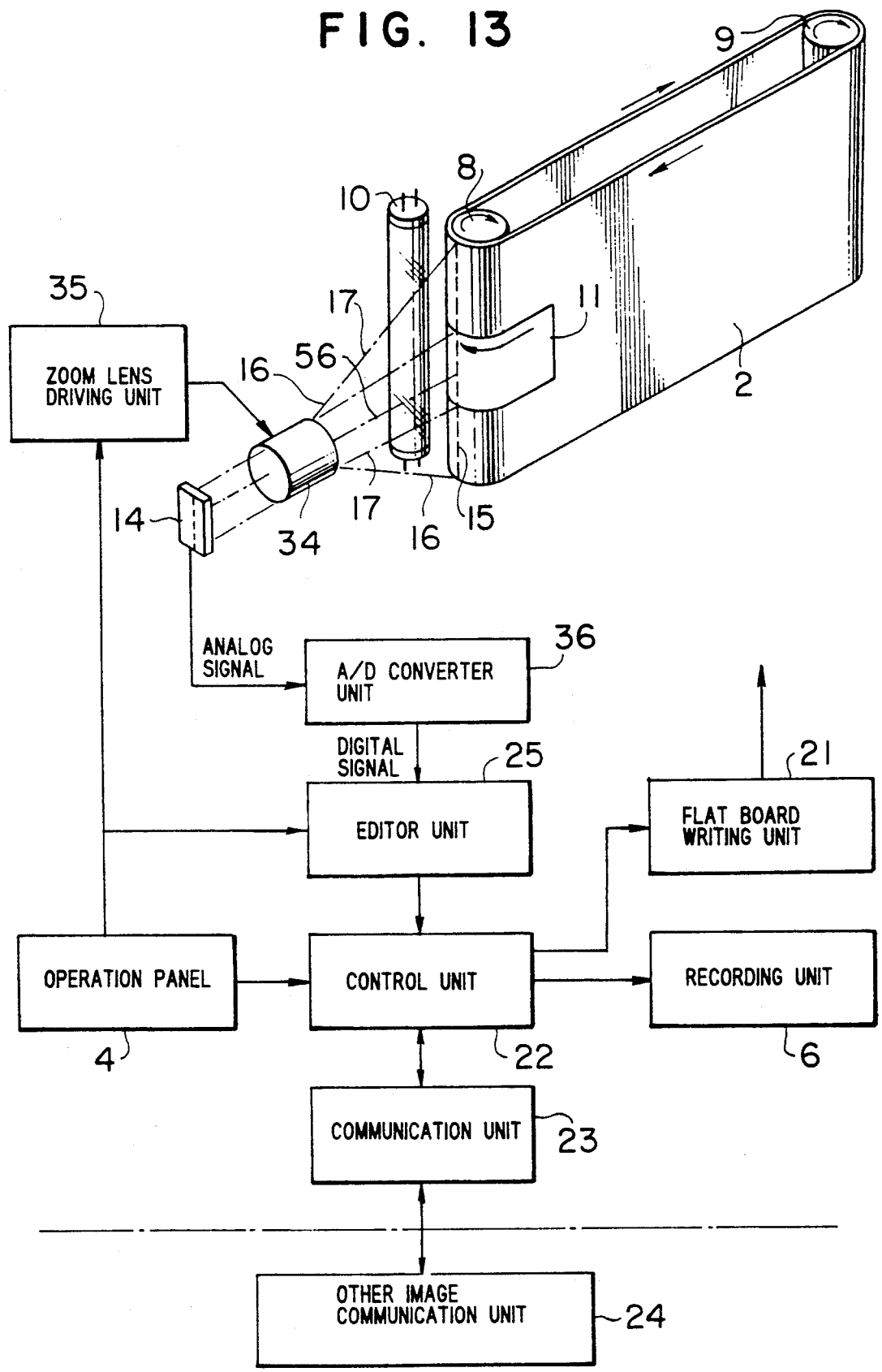
FIG. 13 shows the structure, in the form of a block diagram, of an eighth embodiment of this invention.

FIG. 13 shows the eighth embodiment of this invention. This embodiment has the editor function described with FIG. 12 and the image signal communication function for communication with another image communication apparatus described with FIG. 11. According to this embodiment, an image on the flat board 2 or the original document 11 can be enlarged or reduced at an optional factor and transmitted to another image communication apparatus. Conversely, the signal from another image communication apparatus can be enlarged or reduced for the display thereof. This is also applicable to the embodiments described with FIGS. 9 and 10.

Figure 14:
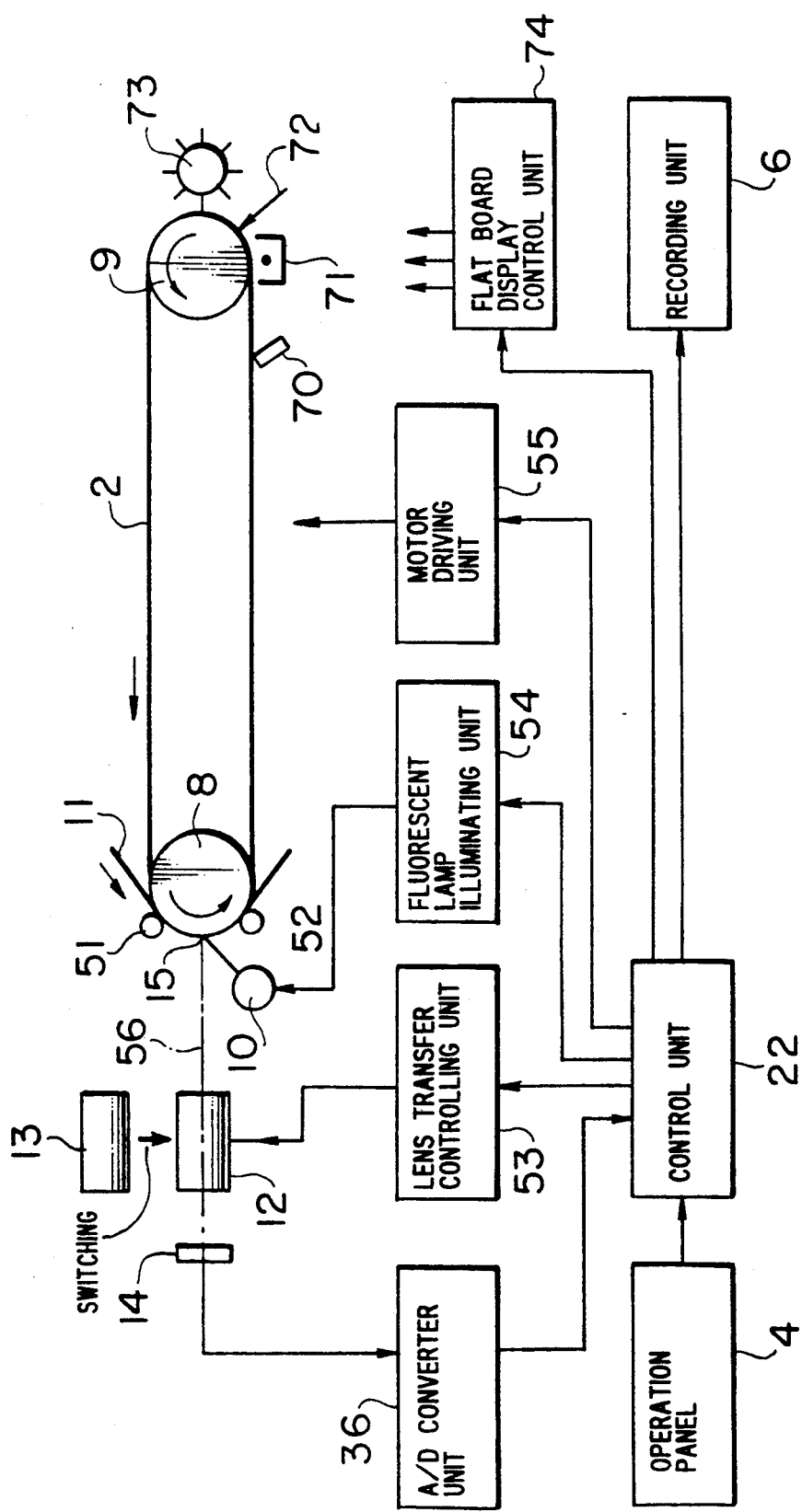
FIG. 14 shows the structure, in the form of block a diagram, of a ninth embodiment of this invention.

FIG. 14 shows the ninth embodiment of this invention. This embodiment shows that various recording methods for the flat board writing unit can be used with the intelligent board of this invention.

As the recording method for the flat board writing unit 21 of the first embodiment of this invention shown in FIG. 3, there may use the electrophotographic method, ink jet method, pen plotting method, thermal method and other methods. The electrophotographic method is shown in FIG. 14 as an example of the flat board writing method. Reference numeral 70 represents a blade for scraping off toner attached to the flat board 2, 71 a charger, 72 an optical signal which is modulated by an image signal and whose frequency is different from that of a visible light, 73 a developer for attaching toner, and 74 a flat board writing control unit. The flat board 2 is made of photosensitive material whose resistance value changes with light 72. A latent image (charge image not visible) is formed on the flat board 2, by using the optical signal 72, and is formed into a visible image by attaching toner, by means of the developer 73.

As the electrophotographic method the following two methods are further considered.

There can be used one method of forming the flat board 2 by insulating material and of sticking a toner on separately provided sensitive material and transfering the toner to the flat board 2, and the other method of using an electroconductive toner as the toner and of directly sticking the toner on the flat board 2 comprising insulating material without using any light signal like the above methods.

In the above embodiments, a marker pen has been used as a writing utensil for the flat board. The invention is not limited to such writing utensil with regard to the flat board, but any other writing means may be used so long as it can write characters or graphics which can be visually discriminated from the color of the surface of the flat board.

Further, a flat board of other types may also be used which can visually discriminate between an image on the flat board and the background of the flat board, wherein although the flat board shows only the color of the background thereof when no image is displayed, the image written on the flat board can be discriminated from the background because of the difference of reflected light amount between the image and background.

According to the present invention, the apparatus comprises the flat board capable of being written with an image by using a writing utensil, the light source for illuminating the flat board and the original document, the lenses for converging the reflected light from the flat board and original document, the reading unit constructed of the photoelectric conversion unit for converting the reflected light converged by the lens into an electrical signal, the recording unit for recording an image on a recording medium in accordance with the electrical signal outputted from the reading unit. Accordingly the following effects ① to ⑩ can be obtained:

① The adjustment of the reading optical unit for reading both the original document and flat board is sufficient if it is carried out only once, thereby lowering the manufacturing cost.

② The reading optical system for reading both the original document and flat board can be made compact, thereby making the apparatus small.

③ In addition to the function of a conventional electronic blackboard, prepared conference data can be read with the electronic blackboard of this invention and displayed on the flat board without hand-writing. The displayed data may be corrected through hand-writing, or other conference data may added thereto through hand-writing. Accordingly conference participants can concentrate on discussion with efficient conference proceedings.

With the structure of the intelligent board described above, the following effect ④ can be obtained if there is added the communication unit for transmitting the electrical signal outputted from the reading unit to another image communication apparatus or receiving the electrical signal transmitted from another image communication apparatus, and the following effect ⑤ can be obtained if there is added the editor unit for editing the electrical signal outputted from the reading unit.

④ The following functions are available. Namely, reading an image on the original document and transmitting it to another image communication apparatus, reading an image on the flat board and transmitting it to another image communication apparatus, displaying an image signal transmitted from another image communication apparatus on the flat board, recording the image signal transmitted from another image communication apparatus on the recording paper, and other functions.

⑤ Images on the original document and flat board are read and edited to display them on the flat board or the recording paper, so that the displayed or printed image can be visually recognized easily to permit efficient conference proceedings.

Instead of using the flat board lens and original document lens, the zoom lens is used so that:

⑥ The reduction factor of the zoom lens can be changed continuously as desired. Therefore, it is unnecessary to use the lens transfer controlling unit for switching between the flat board lens and original document lens, thereby making the overall dimension of the apparatus small.

Further, by making different the optical axes of the reflected light from the flat board and original document, ⑦ The reading unit for reading the original document can be mounted at a desired position of the intelligent board, to thereby improve the operability.

⑧ While reading the flat board, the image on the original document can be transmitted to another image communication apparatus.

⑨ While reading the original document, the image on the flat board can be transmitted to another image communication apparatus.

⑩ The images on both the flat board and original document can be picked up optically at the same time, and the composite image can be transmitted to another image communication apparatus.

We claim:

1. An electronic print board comprising:
   a flat board having a background color and adapted for presentation thereon of an image in a different color;
   input means, including a single photoelectric conversion element, for scanning in a single scanning line an image presented on said flat board or in substantially the same scanning line an image on an original document and converting the scanned image into an electrical signal;
   image converging and projecting means for converging the reflected light from the scanning line on the image written on said flat board or from the scanning line on the image on the original document to provide on said single photoelectric conversion element in substantially equal sizes a projected image of the scanning line on the image on the original document or a projected image of the scanning line on the image on said flat board;
   recording means responsive to the electrical signal for recording the projected image; and
   flat board writing means responsive to the electrical signal for presenting on said flat board an image of the projected image.

2. An electronic print board according to claim 1, wherein said image converging and projecting means comprises a first optical lens for said original document and a second optical lens for said flat board.

3. An electronic print board according to claim 2, wherein each optical lens is a fixed focal length lens.

4. An electronic print board as claimed in claim 1, further comprising:
   a communication unit for encoding, modulating and transmitting the electrical signal from said input means and for demodulating and decoding a received electrical signal to produce an image;
   an operation unit for entry of instructions to designate the operation of and activate said print board; and
   a board control unit for controlling the operation of said print board in accordance with instructions from said operation unit.

5. An electronic print board as claimed in claim 1, further comprising:
   an editing unit for editing the electrical signal from said input means to provide an edited electrical signal representative of an image different from the image of the electrical signal from said input means.

6. An electronic print board comprising:
   a flat board having a background color and adapted for presentation thereon of an image in a different color;
   input means, including a single photoelectric conversion element, for converting reflected light from an image presented on said flat board or an image on an original document into an electrical signal;
   image converging and projecting means, including a variable focal length optical lens, for converging the reflected light from the image written on said flat board or from the image on the original document to provide on said single photoelectric conversion element in substantially equal sizes a projected image of the image on the original document or a projected image of the image on said flat board;
   recording means responsive to the electrical signal for recording the projected image; and
   flat board writing means responsive to the electrical signal for presenting on said flat board an image of the projected image.

7. An electronic print board comprising:
   a flat board having a background color and adapted for presentation thereon of an image in a different color;
   input means, including a single photoelectric conversion element, for converting reflected light from an image presented on said flat board or an image on an original document into an electrical signal;
   image converging and projecting means for illuminating said flat board and the original document and converging the reflected light from the image written on said flat board or from the image on the original document such that the optical path of the light illuminating and reflected by said flat board and the light illuminating and reflected by the original document is substantially the same, to provide on said single photoelectric conversion element a projected image of the image on the original document or a projected image of the image on said flat board;
   recording means responsive to the electrical signal for recording the projected image; and flat board writing means responsive to the electrical signal for presenting on said flat board an image of the projected image.

8. An electronic print board as claimed in claim 7, further comprising:
   a communication unit for encoding, modulating and transmitting the electrical signal from said input means and for demodulating and decoding a received electrical signal to produce an image;
   an operation unit for entry of instructions to designate the operation of and activate said print board; and
   a board control unit for controlling the operation of said print board in accordance with instructions from said operation unit.

9. An electronic print board as claimed in claim 8, further comprising:
   an editing unit for editing the electrical signal from said input means to provide an edited electrical signal representative of an image different from the image of the electrical signal from said input means.

10. An electronic print board as claimed in claim 7, further comprising:
    an editing unit for editing the electrical signal from said input means to provide an edited electrical signal representative of an image different from the image of the electrical signal from said input means.

11. An electronic print board comprising:
    a flat board having a background color and adapted for presentation thereon of an image in a different color;
    input means, including a single photoelectric conversion element, for converting light projected thereon into an electrical signal;
    image converging and projecting means for simultaneously illuminating both said flat board and an original document and simultaneously converging both the reflected light from the image written on said flat board and the reflected light from an image on the original document such that the optical path of the light illuminating and reflected by said flat board and the optical path of the light illuminating and reflected by the original document are substantially different, to provide on said single photoelectric conversion element a combined projected image of the image on the original document and the image on said flat board;
    recording means responsive to the electrical signal for recording the combined projected image;
    flat board writing means responsive to the electrical signal for presenting on said flat board an image of the combined projected image;
    a communication unit for encoding, modulating and transmitting the electrical signal from said input means and for demodulating and decoding a received electrical signal to produce an image;
    an operation unit for entry of instructions to designate the operation of and activate said electronic print board; and
    a board control unit for controlling the operation of said electronic print board in accordance with instructions from said operation unit.

12. An electronic print board comprising:
    a flat board having a background color and adapted for presentation thereon of an image in a different color;
    input means, including a single photoelectric conversion element, for converting light projected thereon into an electrical signal;
    image converging and projecting means for simultaneously illuminating both said flat board and an original document and simultaneously converging both the reflected light from the image written on said flat board and the reflected light from an image on the original document such that the optical path of the light illuminating and reflected by said flat board and the optical path of the light illuminating and reflected by the original document are substantially different, to provide on said single photoelectric conversion element a combined projected image of the image on the original document and the image on said flat board;
    recording means responsive to the electrical signal for recording the combined projected image;
    flat board writing means responsive to the electrical signal for presenting on said flat board an image of the combined projected image;
    an editing unit for editing the electrical signal from said input means to provide an edited signal representative of an image different from the image of the electrical signal from said input means;
    an operation unit for entry of instructions to designate the operation of and activate said electronic print board; and
    a board control unit for controlling the operation of said electronic print board in accordance with instructions from said operation unit.

13. An electronic print board as claimed in claim 12, further comprising:
    a communication unit for encoding, modulating and transmitting a selected one of the electrical signal from said input means and the edited electrical signal and for demodulating and decoding a received electrical signal to produce an image.

* * * * *